United States Patent [19]

Singerman

[11] Patent Number: 5,480,574

[45] Date of Patent: Jan. 2, 1996

[54] 2-AMINOCARBOXYLIC ACID HYDROCHLORIDE COMPOSITIONS FOR REMOVAL OF HARD-WATER DEPOSITS

[76] Inventor: Gary M. Singerman, 38 Falling Star Ct., The Woodlands, Tex. 77381

[21] Appl. No.: 380,346

[22] Filed: Jan. 27, 1995

[51] Int. Cl.$^6$ ............................................. C02F 5/10
[52] U.S. Cl. .................. 252/82; 252/174.23; 252/80; 134/2; 134/3
[58] Field of Search ................ 252/174.23, 546, 252/82, 80; 134/2, 3

[56] References Cited

U.S. PATENT DOCUMENTS

| | | | |
|---|---|---|---|
| 3,878,109 | 4/1975 | Ikeda et al. | 210/500.38 |
| 4,195,127 | 3/1980 | Hartdegen et al. | 435/174 |
| 4,268,424 | 5/1981 | Hall et al. | 252/546 |
| 4,331,447 | 5/1982 | Kamada et al. | 44/574 |
| 4,561,911 | 12/1985 | Tanikawa et al. | 148/638 |
| 4,738,790 | 4/1988 | Miyajima et al. | 252/546 |
| 4,839,461 | 6/1989 | Boehmke | 252/80 |
| 4,929,378 | 5/1990 | Morita | 252/105 |
| 4,988,789 | 1/1991 | Linder | 562/575 |
| 5,147,455 | 9/1992 | Watanabe et al. | 106/2 |
| 5,262,497 | 11/1993 | Watanabe et al. | 526/62 |

Primary Examiner—Prince Willis, Jr.
Assistant Examiner—James M. Silbermann

[57] ABSTRACT

A hard-water-deposit-removing composition comprises the hydrochloride salt of a 2-aminocarboxylic acid, water, optionally a thickener, optionally an abrasive, and optionally a surfactant. The invention further provides a method for removing hard-water deposits from metal, glass, plastic, and ceramic surfaces by applying the composition, allowing contact until substantially all of the deposit is removed, and washing away the composition and dissolved deposit with water.

5 Claims, No Drawings

2-AMINOCARBOXYLIC ACID HYDROCHLORIDE COMPOSITIONS FOR REMOVAL OF HARD-WATER DEPOSITS

BACKGROUND—FIELD OF THE INVENTION

This invention relates to compositions for use in removing hard water deposits from metal, glass, plastic, and ceramic surfaces, including but not limited to surfaces found in water cooling equipment, ice-making machines, automatic coffee-maker machines, faucets, the ceramic surfaces of toilet bowls and shower stalls, and the glass or plastic doors of shower stalls.

BACKGROUND—DESCRIPTION OF PRIOR ART

The deposits which form on surfaces in contact with hard water, for example those surfaces cited in the foregoing paragraph, consist mainly of calcium carbonate, magnesium carbonate, and often iron oxides. These hard deposits are difficult to remove with mechanical abrasion, and often are impossible to remove mechanically because of inaccessibility of the surfaces. Detergent-range surfactants do not remove them. When present, they reduce the efficiency of the equipment in which they are deposited or are objectionable for aesthetic reasons.

Prior art compositions that remove surface deposits caused by the use of hard water often contain highly acidic, corrosive and caustic chemicals such as hydrochloric acid (muriatic acid), phosphoric acid, and sulfamic acid. Hydrochloric acid and phosphoric acid are classified as poisons under the U.S. Federal Caustic Poison Act. Both can cause severe burns to all body tissues. When disposing of them both must be treated as hazardous waste according to U.S. Environmental Protection Agency regulations. Disposal of phosphoric acid is a serious environmental problem. If allowed to enter the environment, it can collect as phosphate in bodies of water, causing or accelerating algae bloom. In addition, the majority of calcium and magnesium salts which form when phosphoric acid is allowed to react with hard-water deposits are not soluble in water and hence are not easily washed away. To overcome this problem, an excess of phosphoric acid must be used to ensure that mainly water-soluble salts are formed, further aggravating environmental problems.

Sulfamic acid, like hydrochloric acid and phosphoric acid, is a highly acidic, corrosive, mineral acid. It is stable when dry, but in water solution it gradually hydrolyzes, forming ammonium bisulfate. When the consumer purchases a hard-water-deposit-removing composition containing sulfamic acid and water, there is no assurance that any of the active ingredient, sulfamic acid, remains in the composition.

Citric acid, which is much less hazardous than the foregoing mineral acids, is also used to remove hard-water deposits. But the calcium and magnesium citrates which form when citric acid is allowed to react with hard-water deposits are only slightly soluble in water and therefore the deposits do not wash away easily. The solubility of these salts increases if an excess of citric acid is used, but even then the citric acid is not as effective in removing hard-water deposits as are the foregoing strong mineral acids.

OBJECTS AND ADVANTAGES

It would be advantageous to produce a hard-water-deposit-removing composition that does not have the aforementioned disadvantages of prior-art deposit removers. Accordingly, several objects and advantages of the present invention are:

(a) to provide a hard-water-deposit-removing composition which avoids the toxicity, health hazards, and environmental hazards of strong mineral acids such as hydrochloric acid, phosphoric acid, and sulfamic acid.

(b) to provide a hard-water-deposit-removing composition which is less corrosive to metal surfaces than strong mineral acids;

(c) to provide a hard-water-deposit-removing composition which is more effective than citric acid;

(d) to provide a hard-water-deposit-removing composition that can be furnished to the consumer in liquid form, paste form, or as a thickened liquid;

(e) to provide a hard-water-deposit-removing composition which may be removed by washing with water;

(f) to provide a hardowater-deposit-removing composition which optionally contains an abrasive for use on exposed surfaces.

Further objects and advantages of the present invention will become apparent as the description thereof proceeds.

SUMMARY OF THE INVENTION

In satisfaction of the foregoing objects and advantages, there is provided by the present invention a novel hard-water-deposit-removing composition comprising 5 to 50 weight percent active ingredients and a balance of water, said active ingredients comprising the hydrochloride salts of the naturally-occurring amino acids (2-aminocarboxylic acids), their enantiomers (optical isomers) or mixtures thereof. The composition may also include optionally a thickener, a surfactant, a coloring agent, perfumes, an abrasive, or a corrosion inhibitor.

Also provided by the present invention is a method of removing hard water deposits from metal, glass, plastic, and ceramic surfaces which comprises applying the composition of the present invention to the surface, allowing said composition to remain on the surface, optionally with mechanical abrasion, until most or all of the deposit has been removed, and removing said composition and dissolved deposits by washing with water.

DESCRIPTION OF THE PREFERRED EMBODIMENTS

As set forth above, the composition of the present invention includes the hydrochloride salts of 2-aminocarboxylic acids, water, and optionally a thickener. Other optional components include surfactants, a coloring agent, perfumes, abrasives, and corrosion inhibitors.

The 2-aminocarboxylic acid hydrochlorides found to be useful in the present invention include hydrochlorides of the naturally-occurring amino acids, their optical isomers, and mixtures thereof as represented by Structural Formulas I, II, and III,

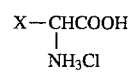

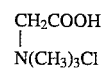

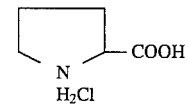

wherein X (Structural Formula I) may be hydrogen, a saturated alkyl radical having from 1 to 4 carbon atoms, or X may be the $HOCH_2$— radical, the $CH_3CH(OH)$— radical, the $CH_3SCH_2CH_2$— radical, the $HOOCCH_2$— radical, the $HOOCCH_2CH_2$— radical, or the $H_2N(CH_2)_4$— radical, or mixtures thereof.

The 2-aminocarboxylic acids useful in the present invention therefore include glycine, alanine, valine, leucine, isoleucine, serine, threonine, methionine, aspartic acid, glutamic acid, lysine, or mixtures thereof. Additionally, betaine hydrochloride (or mixtures thereof with the aforementioned hydrochlorides), represented by structural formula II, is useful in the present invention, as is proline hydrochloride (III) and its mixtures with the foregoing amino acid hydrochlorides.

The essential elements which must be present in the 2-aminocarboxylic acid hydrochloride are (1) at least one quaternized amine group, charge balanced by the chloride anion, e.g. $-NH_3Cl$ or $-N(CH_3)_3Cl$, or the quaternized amine in proline hydrochloride, and (2) at least one carboxylic acid group, —COOH. If only one of these two essential groups is present in the molecule, it will be much less effective in removing hard water deposits (see Example 1). A mixture of two different molecules, one containing only the quaternized amine group, the second containing only the carboxylic acid group, will likewise be much less effective in removing hard water deposits (Example 1).

Other aminocarboxylic acid hydrochlorides, for example 4-aminobutyric acid hydrochloride, in which the amine group is in a position other than the 2-position, are likely to be effective in removing hard-water deposits, but these are generally expensive and not readily available. Betaine hydrochlorides having structure II, but in which one of the methyl groups attached to nitrogen is replaced by a long-chain alkyl group in the surfactant range ($C_2$ to $C_{22}$) are available, and likely are effective in removing hard-water deposits, but can cause skin rashes and other allergic reactions with repeated use.

On the other hand, betaine is widely distributed in plants and animals. Betaine hydrochloride, included in the present invention, is used medically as a lipotropic agent. It is included also in a commercially available over-the-counter "multiple digestive enzyme formula" for human consumption. Its use for human consumption as a nutritional supplement, for "heart strengthening and aging retardation", as an artificial gastric juice, and in the treatment of digestive-tract disorders of domestic animals is taught in the patent literature. Likewise, glutamic acid hydrochloride, also included in the present invention, is claimed to be useful as a stomach acidifier in over-the-counter products and as a component of beverages. Glycine hydrochloride is used as an artificial gastric juice, given to patients with chronic gastritis. The patent literature claims its use at 1.5 parts in a hair dye composition that is said to be stable and nonirritating to the skin. It is also used in an aqueous solution of a meat aroma composition, which is sprayed on precooked noodles or rice.

The chloride anion balancing the positive charge on the quaternized amine in the 2-aminocarboxylic acid hydrochlorides of the present invention could conceivably be replaced effectively by the nitrate anion, the sulfate or bisulfate anions, or a phosphate anion. However, the nitrate anion has undesirable oxidant properties, the calcium and magnesium salts of phosphate and sulfate anions have limited solubility in water unless excess is used, and the phosphate anion causes environmental problems as mentioned above.

In a preferred embodiment, the 2-aminocarboxylic acid hydrochloride of the present invention is glycine hydrochloride, structure I, wherein X=H, because this material is more readily available and less expensive than other 2-aminocarboxylic acid hydrochlorides.

A second essential ingredient of the present invention is water, for without dissolving the 2-aminocarboxylic acid hydrochloride in water, it will not react with and dissolve the hard-water deposits. Ordinary drinking water, i.e., tap water, may be used instead of the more expensive distilled water or deionized water. The water may be present in broadly varying amounts, from 5 wt. % to 95 wt. %, depending on the presence or absence of optional ingredients including but not limited to thickeners, abrasives, and surfactants, and whether the hard-water-deposit-removing composition is formulated as a liquid, a paste, or a thickened liquid. A paste composition requires less water than a liquid composition.

It has been found that the active ingredient, the 2-aminocarboxylic acid hydrochloride, may be present in the hard-water-deposit-removing composition in amounts varying from 5 wt. % to 50 wt. %. In a preferred embodiment, the 2-aminocarboxylic acid hydrochloride of the present invention varies from 10 wt. % to 40 wt. % of the deposit-removing composition.

In a further embodiment of the invention, it is desirable to include optionally a thickening agent in the composition when an increase in viscosity of the mixture is needed, for example when the composition is used to remove hard-water deposits from a non-horizontal surface. Suitable thickening agents include biodegradable natural polymers and biodegradable derivatives thereof such as cellulose ethers, cellulose esters, starch ethers and esters, and polysaccharides including xanthan gum. Other acceptable thickeners include lignin sulfonates, synthetic polymers such as those based on acrylic acid or methacrylic acid, ethoxylated alkyl amines, and inorganic clays such as kaolin clay or a water-dispersible alumina which are environmentally benign. Specifically preferred materials include xanthan gum, hydroxyethyl cellulose and ethoxylated alkylamines. The amount of thickening agent which should be used depends on the specific thickener and the degree of thickening required and will generally be in the range of about 0.1 wt. % to 7.0 wt. %.

When cleaning hard-water deposits from exposed surfaces, it is sometimes desirable to incorporate an abrasive agent in the composition to aid in removal of the deposits. Abrasives which have a relatively low Mohs hardness are preferred in order to minimize scratching of the surface. Included among these are sodium chloride and inorganic clays or aluminas such as kaolin clay or non-water-dispersible alumina. A specifically preferred abrasive is sodium chloride. The amount of abrasive required depends on the specific abrasive and the degree of abrasiveness desired and will generally be in the range of about 10 wt% to 80 wt. %.

If desired, the composition can include optionally a surfactant. The surfactant will remove oils and greases from the surface being cleaned. Preferably these would be selected from among those well known in the detergent industry, especially the biodegradable anionic, nonionic and amphoteric surfactants that might be employed in, for example a dishwashing formulation. These include sodium dodecylbenzenesulfonate, sodium laurylsulfate, ethoxylated alcohols, ethoxylated alkylphenols, alkylaminoproprionates, and lauryl dimethyl glycine. The surfactants, and combinations thereof, can be present in amounts varying from 0.1 to 10 wt. %.

When cleaning hard-water deposits from ferrous metal surfaces, it is desirable to incorporate into the formulation a corrosion-inhibiting component to protect the cleaned surface. This does not prevent a build-up of hard-water deposits in future, but it does help maintain, by inhibiting corrosion, the integrity of the metal surface. The corrosion inhibitor will be an organic or inorganic material utilized in amounts from 0.05 to 1.0 wt. %. These include, but are not limited to, benzotriazole, sodium nitrate thiourea, acridine, dibenzyl sulfoxide, organic monocarboxylic acids, and ethoxylated alkylamines. Benzotriazole, the monocarboxylic acids and the ethoxylated alkyl amines are preferred.

Coloring agents and perfumes in small amounts may be added optionally to the formulation, although these serve an aesthetic function only. The preferred colorants are those approved by the U.S. Food and Drug Administration for use in foods, drugs and cosmetics. These are water soluble and safe to use. Perfumes are selected from among those in common use by the fragrance industry and utilized at a concentration of 0.1–1.0 wt.%.

The present invention also provides methods for the application of the composition to remove hard-water deposits from metal, glass, plastic, and ceramic surfaces. The composition may be brushed, sprayed, or applied by dipping to exposed surfaces. If thickened it will remain on a non-horizontal surface to effect cleaning. Cleaning of exposed surfaces may be accelerated by use of mechanical abrasion using non-scratch brushes, scrubbing pads, cloths, and the like. For inaccessible surfaces, for example those in ice-making machines, water-cooling equipment, and automatic coffeemaker machines, a liquid composition is poured into the machine and allowed to stand or is pumped through the machine until the hard-water deposits are substantially removed. After most or all of the deposits are removed, the surface is then washed with water, or water is pumped through the machine, to remove the composition and dissolved deposits. In cases where the deposits are relatively heavy, more than one application of the composition of the present invention may be required.

The following examples are presented to illustrate the invention, but the invention is not to be considered as limited thereto.

EXAMPLE 1

The following four solutions were prepared at room temperature: (1) 1.92 g (0.01 mole) citric acid and 18.0 g water, (2) 1.12 g (0.01 mole) glycine hydrochloride and 18.0 g. water, (3) 0.71 g (0.05 mole) diethanolamine hydrochloride and 0.96 g (0.05 mole) citric acid and 18.0 g water, and (4) 1.42 g (0.01 mole) diethanolamine hydrochloride and 1.92 g (0.01 mole ) citric acid and 18.0 g water.

To each of the above four solutions was added 0.5 g (0.005 mole) powdered calcium carbonate, a major constituent of hard-water deposits, and the time required for the calcium carbonate to dissolve was recorded: solution (1) 3 minutes, solution (2) 30 seconds, solution (3) almost, but not completely dissolved after 15 minutes, and solution (4) 7 minutes. These data illustrate two points. First glycine hydrochloride is much more efficient at dissolving calcium carbonate, hence hard-water deposits, than is citric acid, which bears only one of the two functional groups required for maximum efficiency. Second, even though both functional groups, a quaternized amine group and a carboxylic acid group, are present in solutions 2, 3, and 4, they are present in the same molecule (glycine hydrochloride) only in solution 2. In solutions 3 and 4, the two functional groups are present in separate molecules (diethanolamine hydrochloride and citric acid). Glycine hydrochloride (solution 2) is far more efficient at dissolving calcium carbonate than is the mixture of diethanolamine hydrochloride and citric acid (solutions 3 and 4), thus demonstrating the requirement that both functional groups be present in the same molecule. In fact, the data indicate that diethanolamine hydrochloride actually retards dissolution of the calcium carbonate. After standing overnight at 6° C., solutions 1, 3, and 4 deposited white crystals of calcium citrate, whereas solution 2 (glycine hydrochloride) remained clear and homogenous.

EXAMPLE 2

Glycine (16.52 g, 0.22 mole) was dissolved in 27 g water. To it was added 5.07 g of 32% hydrochloric acid (0.22 mole HCl) to give a clear, aqueous solution containing 24.54 g (35.8 wt. %) glycine hydrochloride. This composition rapidly dissolved 3.0 g calcium carbonate powder with evolution of carbon dioxide to give a clear solution. The composition also cleaned hard water deposits from the inside of a 12-cup automatic coffeemaker and from a commercial ice-making machine within a few minutes. When a hard-water-deposit-clogged shower head in a residential shower stall was soaked in this composition, the deposits were completely removed within a few minutes.

EXAMPLE 3

A paste-like mixture was prepared by mixing 25.0 g glutamic acid hydrochloride, 100.0 g sodium chloride (powdered), 10.0 g water, and 15.0 g of a commercially available dishwashing liquid (Joy) containing anionic and nonionic surfactants. The paste contained 16.7 wt. % of the active ingredient, glutamic acid hydrochloride, and 66.7 wt. % of sodium chloride abrasive. When applied to hard water deposits on the ceramic tile and glass door of a residential shower stall with a damp cotton rag, it produced a clean, shiny surface within a few minutes. It also easily removed hard-water deposits from the outer surface of the shower's chromed water control valve, and the hard-water-deposit ring in a residential toilet bowl.

EXAMPLE 4

A thickened, non-abrasive composition was prepared as follows: to an intimate mixture of 100.8 g glycine (1.34 moles) and 5.0 g xanthan gum was added 474.0 g water. The mixture was stirred about 1 minute in a kitchen food blender at room temperature until the glycine was dissolved and the xanthan gum had thickened the mixture. To this was added 148.0 g of 32% hydrochloric acid (47.36 g, 1.29 moles HCl). The mixture was stirred by hand 5 minutes to ensure that all the hydrochloric acid had reacted with the glycine. The mixture was tinted blue with 3 drops of FD&C blue #1 food coloring. The resulting composition was a thick, viscous liquid containing 20.4 wt. % of the active ingredient, glycine hydrochloride. The composition was applied to the hard-water-deposit ring in a residential toilet bowl and to the deposits on the ceramic tile and glass door of a residential shower stall with a damp, non-scratch plastic kitchen scouring pad. The composition quickly removed the hard-water deposits in all cases.

The invention has been described herein with reference to certain preferred embodiments. However, obvious variations thereon will become apparent to those skilled in the art. Accordingly, the scope of the invention should be determined by the appended claims and their legal equivalents, rather than by the examples given.

I claim:

1. A composition for removing hard-water deposits from metal, glass, plastic, ceramic surfaces comprising 50 to 95 weight percent water and 5 to 50 weight percent of a 2-aminocarboxylic acid hydrochloride selected from the group consisting of glycine hydrochloride, alanine hydrochloride, valine hydrochloride, leucine hydrochloride, isoleucine hydrochloride, serine hydrochloride, threonine hydrochloride, methionine hydrochloride aspartic acid hydrochloride, glutamic acid hydrochloride, lysine hydrochloride, proline hydrochloride, betaine hydrochloride, their optical isomers, or mixtures thereof, and further comprising from 0.1 to 7.0 weight percent of a thickening agent, from 10.0 to 45.0 weight percent of an abrasive agent, or from 0.1 to 10.0 weight percent of a surfactant or mixtures thereof.

2. The composition of claim 1 wherein the thickening agent is hydroxyethylcellulose, xanthan gum, lignin sulfonates acrylic acid or methacrylic acid polymers, an ethoxylated amine, a kaolin clay, a water-dispersible alumina, or mixtures thereof.

3. The composition of claim 1 wherein the abrasive agent is sodium chloride, kaolin clay, a non-water-dispersible alumina, or mixtures thereof.

4. The composition of claim 1 wherein the surfactant is sodium dodecylbenzenesulfonate, sodium lauryl sulfate, ethoxylated alcohols, ethoxylated alkylphenols alkylaminopropionates, lauryl dimethyl glycine, or mixtures thereof.

5. A method for removing hard-water deposits from metal, glass, plastic, and ceramic surfaces comprising the steps of:

a. applying to the surface a deposit-removing composition comprising 5 to 50 weight percent active ingredients and a balance of water, said active ingredients comprising the hydrochloride salts of naturally-occurring 2-aminocarboxylic acids, their optical isomers, or mixtures thereof, and b. allowing said deposit-removing composition to remain on the surface, optionally with mechanical abrasion, until at least 90 percent of the deposit is dissolved and loosened, and c. removing said deposit-removing composition together with the dissolved and loosened deposit by washing with water.

* * * * *